US008985624B2

United States Patent
McFarland

(10) Patent No.: US 8,985,624 B2
(45) Date of Patent: *Mar. 24, 2015

(54) DUAL STAGE AIR BAG INFLATOR

(71) Applicant: TRW Vehicle Safety Systems Inc., Washington, MI (US)

(72) Inventor: Eric R McFarland, Gilbert, AZ (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,406

(22) Filed: May 16, 2013

(65) Prior Publication Data

US 2014/0145421 A1   May 29, 2014

Related U.S. Application Data

(62) Division of application No. 11/634,504, filed on Dec. 6, 2006, now Pat. No. 8,444,179.

(51) Int. Cl.
*B60R 21/26* (2011.01)
*B60R 21/264* (2006.01)

(52) U.S. Cl.
CPC .............. *B60R 21/26* (2013.01); *B60R 21/2644* (2013.01); *B60R 2021/2648* (2013.01)
USPC ............................ 280/736; 280/741; 102/530

(58) Field of Classification Search
USPC .................... 102/530; 280/736, 737, 740–742
See application file for complete search history.

(56) References Cited

U.S. PATENT DOCUMENTS

| | | | |
|---|---|---|---|
| 5,556,130 A * | 9/1996 | Fulmer ......................... | 280/741 |
| 5,851,027 A * | 12/1998 | DiGiacomo et al. .......... | 280/736 |
| 5,951,040 A | 9/1999 | McFarland et al. | |
| 6,032,979 A | 3/2000 | Mossi et al. | |
| 6,142,515 A | 11/2000 | Mika | |
| 6,189,927 B1 | 2/2001 | Mossi et al. | |
| 6,227,565 B1 | 5/2001 | McFarland et al. | |
| 6,364,353 B2 | 4/2002 | Green, Jr. et al. | |
| 6,474,684 B1 * | 11/2002 | Ludwig et al. ................ | 280/741 |
| 6,942,249 B2 * | 9/2005 | Iwai et al. ..................... | 280/741 |
| 8,444,179 B2 * | 5/2013 | McFarland .................... | 280/736 |

* cited by examiner

*Primary Examiner* — Paul N Dickson
*Assistant Examiner* — Laura Freedman
(74) *Attorney, Agent, or Firm* — Tarolli, Sundheim, Covell & Tummino LLP

(57) ABSTRACT

Apparatus for inflating an inflatable vehicle occupant protection device includes a primary housing, a primary inflation fluid source, a secondary housing, and a secondary inflation fluid source. The primary and secondary housings are constructed from sheet metal by stamping. The primary inflation fluid source is located in the primary housing. The primary inflation fluid source is actuatable to effect a primary flow of inflation fluid out of the primary housing to inflate the inflatable device. The secondary housing is disposed within the primary housing. The secondary inflation fluid source is located in the secondary housing. The secondary inflation fluid source is actuatable to affect a secondary flow of inflation fluid to supplement the primary flow of inflation fluid. The secondary housing has a first portion that moves at least partially out of engagement with a second portion of the secondary housing when the secondary inflation fluid source is actuated.

20 Claims, 8 Drawing Sheets

DUAL STAGE AIR BAG INFLATOR

RELATED APPLICATION

This application is a divisional of U.S. Ser. No. 11/634,504, filed Dec. 6, 2006, which issued as U.S. Pat. No. 8,444,179 on May 21, 2013.

TECHNICAL FIELD

The present invention relates to an apparatus for inflating an inflatable vehicle occupant protection device and, more particularly, to an inflator for the inflatable vehicle occupant protection device.

BACKGROUND OF THE INVENTION

An inflatable vehicle occupant protection device, such as an air bag, is deployed upon the occurrence of a vehicle collision. The air bag is part of a conventional vehicle occupant protection apparatus that includes a collision sensor and an inflator. The inflator includes a housing and an inflation fluid source in the housing. Upon sensing the occurrence of an event for which inflation of the air bag is desired, the inflator is actuated and produces inflation fluid under pressure in the inflator housing. The pressurized inflation fluid is directed out of the inflator housing and inflates the air bag into the vehicle occupant compartment to help protect the vehicle occupants.

When the inflator is actuated at an elevated ambient temperature, the pressure of the inflation fluid in the inflator housing increases. An inflator must be strong enough structurally to contain these elevated pressures. If the pressure in the inflator housing is increased in this manner, the mass flow rate of the inflation fluid flowing into the air bag may also increase.

SUMMARY OF THE INVENTION

The present invention relates to an apparatus for providing inflation fluid for inflating an inflatable vehicle occupant protection device. The apparatus includes a primary housing, a primary inflation fluid source, a secondary housing, and a secondary inflation fluid source. The primary housing is constructed from sheet metal by stamping. The primary inflation fluid source is located in the primary housing. The primary inflation fluid source is actuatable to affect a primary flow of inflation fluid out of the primary housing to inflate the inflatable device. The secondary housing is constructed from sheet metal by stamping. The secondary housing is disposed within the primary housing. The secondary inflation fluid source is located in the secondary housing. The secondary inflation fluid source is actuatable to affect a secondary flow of inflation fluid to supplement the primary flow of inflation fluid. The secondary housing has a first portion that moves at least partially out of engagement with a second portion of the secondary housing when the secondary inflation fluid source is actuated.

The present invention relates to an inflator for providing inflation fluid for inflating an inflatable vehicle occupant protection device. The inflator includes a primary housing, a primary inflation fluid source, a secondary housing, and a secondary inflation fluid source. The primary housing has an upper wall and a lower wall opposite the upper wall. The primary housing is constructed from sheet metal by stamping. The primary inflation fluid source is disposed within the primary housing and is actuatable to deform the primary housing to move the upper wall and the lower wall away from each other. The secondary housing is constructed from sheet metal by stamping. The secondary housing is disposed within the primary housing. The secondary housing has an upper portion abutting the upper wall of the primary housing and a lower portion abutting the lower wall of the primary housing. The secondary inflation fluid source is disposed within the secondary housing and is actuatable to move the upper portion of the secondary housing at least partially out of engagement with the lower portion of the secondary housing subsequent to the primary housing being deformed by the primary inflation fluid source.

BRIEF DESCRIPTION OF THE DRAWINGS

Further features of the present invention will become apparent to those skilled in the art to which the present invention relates from reading the following description with reference to the accompanying drawings, in which.

DESCRIPTION OF EMBODIMENTS

Figure 1:
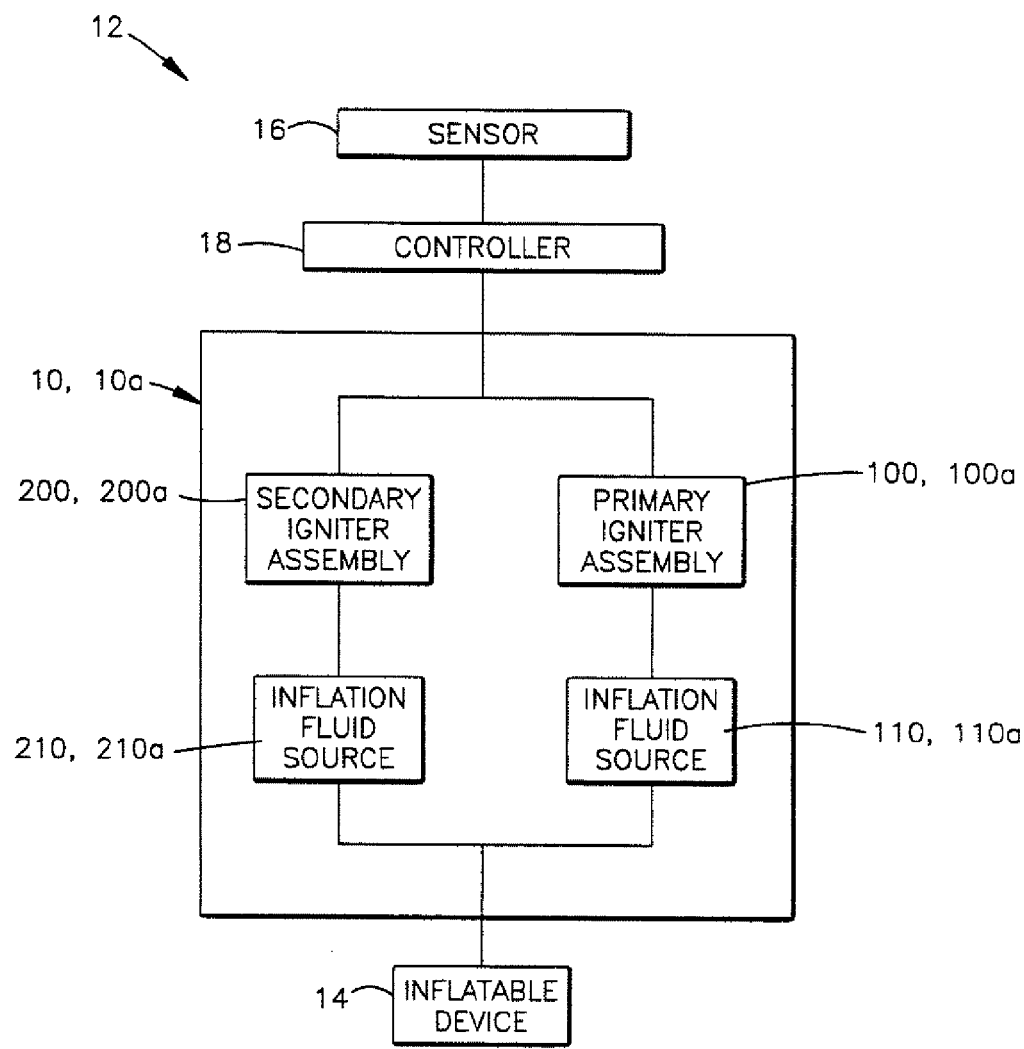
FIG. 1 is a schematic view of a vehicle occupant protection apparatus including an inflator constructed in accordance with the present invention.

The present invention relates to an apparatus for providing inflation fluid for inflating an inflatable vehicle occupant protection device. As representative of the present invention, FIG. 1 illustrates schematically an inflator 10 that forms part of a vehicle occupant protection apparatus 12.

The apparatus 12 includes an inflatable vehicle occupant protection device 14. The protection device 14, for example, may be a frontal driver or passenger air bag for helping to protect a vehicle occupant. Other inflatable vehicle occupant protection devices that can be used in accordance with the present invention include, for example, but are not limited to inflatable seat belts, inflatable knee bolsters, inflatable head liners, inflatable side curtains, and knee bolsters operated by inflatable air bags.

The inflator 10 is actuatable to provide inflation fluid for inflating the air bag 14. When the air bag 14 is inflated, it extends into a vehicle occupant compartment (not shown) to help protect a vehicle occupant.

The apparatus 12 also includes a sensor 16 for sensing the occurrence of an event for which inflation of the air bag 14 is desired. The sensor 16 is operatively connected to a controller 18. The controller 18 is operative to actuate the inflator 10 in response to conditions sensed via the sensor 16. For example, the sensor 16 may be operative to sense vehicle acceleration or deceleration and provide a signal indicative of the sensed acceleration.

Figure 2:
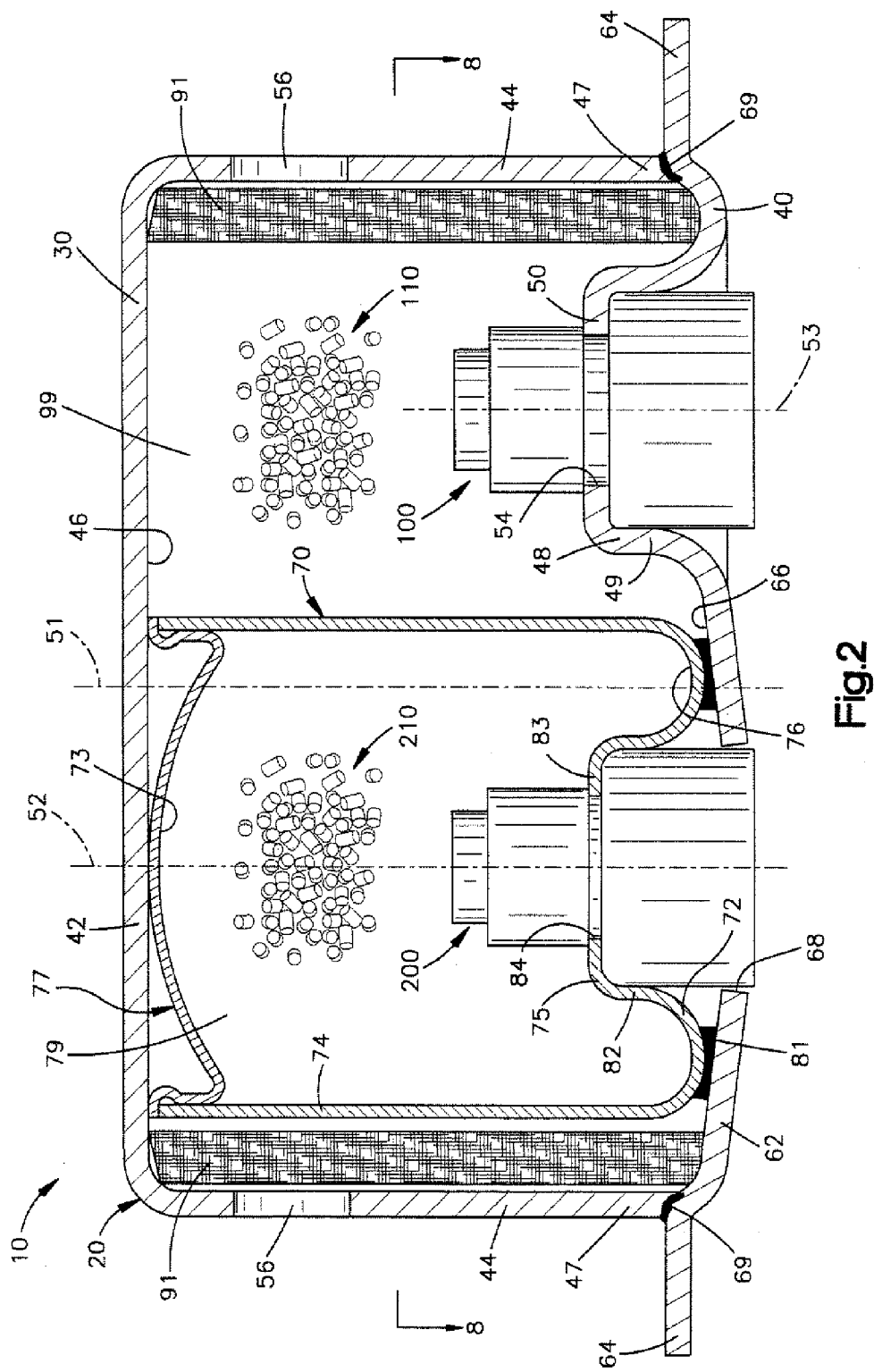
FIG. 2 is a sectional view of an inflator in an unactuated condition in accordance with a first embodiment of the present invention.
Figure 8:
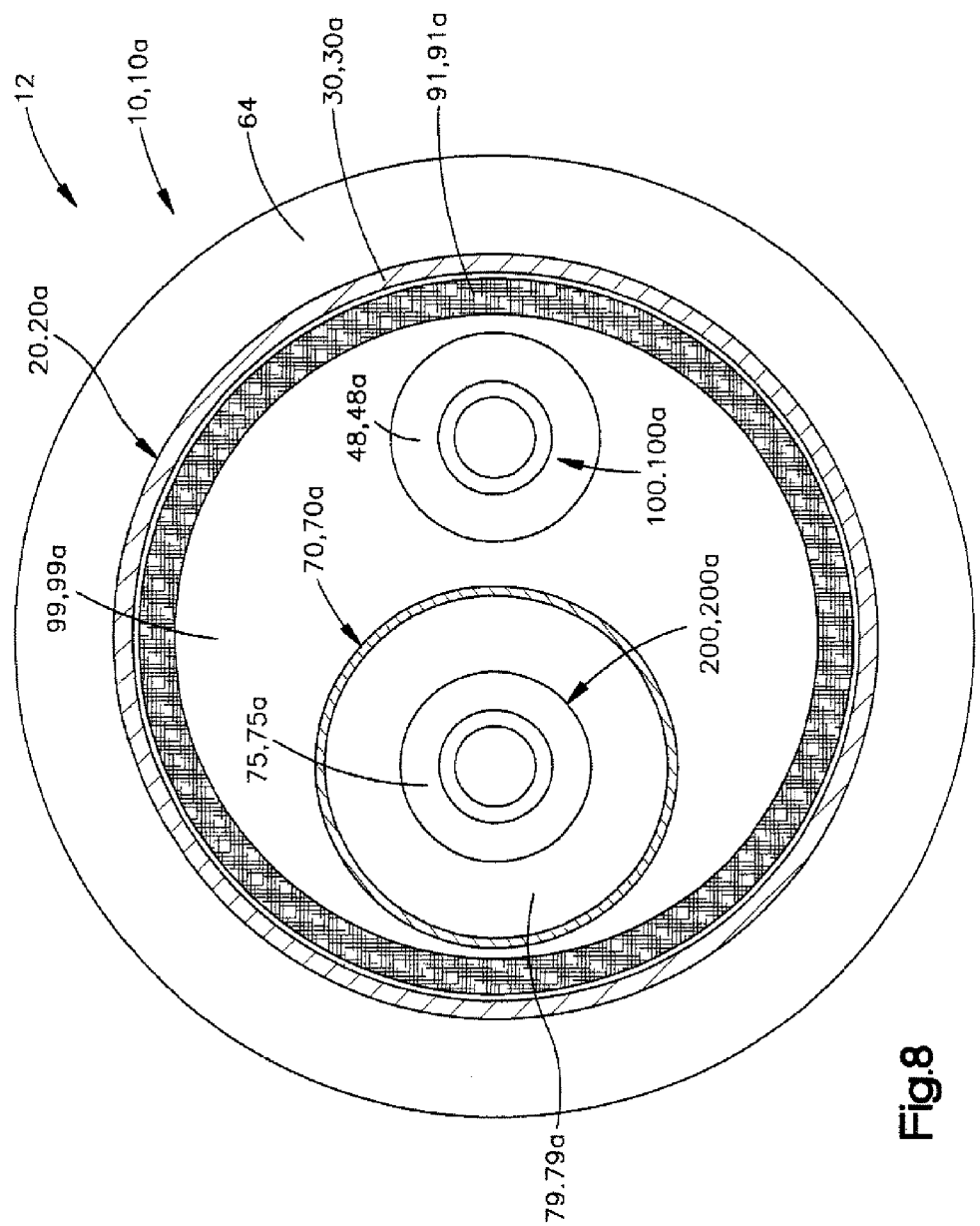
FIG. 8 is a sectional view along line 8-8 in FIGS. 2 and 5.

As shown in FIG. 2, a first embodiment of the inflator 10 includes a generally cylindrical housing 20. Referring to FIGS. 2 and 8, the inflator 10 has a generally cylindrical configuration. The housing 20 (FIG. 2) includes a first or upper housing part 30, referred to herein as a diffuser, and a second or lower housing part 40, referred to herein as a closure.

The diffuser 30 has a downwardly open, cup-shaped configuration centered on a first primary axis 51 of the inflator 10. The diffuser 30 includes a radially extending upper wall 42 and an axially extending side wall 44. As shown in FIG. 2, the upper wall 42 of the diffuser 30 may have a generally planar configuration (FIG. 2). The upper wall 42 could have an alternative configuration (not shown), such as a domed or concave configuration projecting away from the closure 40.

The side wall 44 of the diffuser 30 has a cylindrical configuration centered on the first axis 51. A plurality of inflation fluid outlets, or exhaust ports, 56 are disposed in a circular array about the cylindrical side wall 44. Each one of the inflation fluid outlets 56 extends radially through the side wall 44. The outlets 56 enable flow of inflation fluid out of the inflator 10 to inflate the air bag 14. The outlets 56, as a group, have a fixed, predetermined flow area.

The closure 40 has a shallow dished configuration including a radially extending lower wall 62. The lower wall 62 of the closure 40 has a generally domed configuration and projects away from the diffuser 30. The lower wall 62 has an inner surface 66 presented toward an inner surface 46 of the upper wall 42 of the diffuser 30. A circular opening 68 in the lower wall 62 is centered on a second axis 52 that is parallel to and radially offset from the first axis 51.

The closure 40 is centered on the first axis 51. An annular inflator mounting flange 64 extends radially outward from the side wall 44 of the diffuser 30 at a location below (as viewed in FIG. 2) the inflation fluid outlets 56 of the diffuser 30.

The closure 40 is welded to the lower terminal end 47 of the diffuser 30 with a single, continuous circular weld 69. The diffuser 30 and closure 40 together define a primary combustion chamber 99.

The inflator 10 further includes a primary igniter assembly 100 and a secondary igniter assembly 200. The primary igniter assembly 100 is mounted to a primary mounting portion 48 of the closure 40. The primary mounting portion 48 is formed in the closure 40 by stamping. The primary mounting portion 48 is centered on a third axis 53 parallel to and radially offset from the first and second axes 51, 52. The primary mounting portion 48 extends axially toward the upper wall 42 of the diffuser 30. The primary mounting portion 48 has a recessed and generally cup-shaped configuration with a generally cylindrical side wall 49, an end wall 50, and an opening 54 that extends through the end wall.

The primary igniter assembly 100 may be a known device that is electrically actuatable to generate combustion products. The primary mounting portion 48 helps position the primary igniter assembly 100 on the closure 40. The primary igniter assembly 100 is press fit into the opening 54 in the end wall 50 of the primary mounting portion 48 to secure and position the primary igniter assembly in the primary combustion chamber 99. The primary igniter assembly 100 is thus disposed at a location in the inflator 10 centered on the third axis 53.

The inflator 10 further includes a secondary igniter cup 70 for helping to secure the secondary igniter assembly 200 in the inflator. The secondary igniter cup 70 is centered on the second axis 52. The secondary igniter cup 70 includes a radially extending lower wall 72 and an axially extending cylindrical side wall 74. The lower wall 72 of the secondary igniter cup 70 has a domed or concave configuration projecting toward the closure 40 and a central secondary mounting portion 75 centered on the second axis 52 and projecting away from the closure. The lower wall 72 could have an alternative configuration (not shown), such as a planar configuration.

The secondary mounting portion 75 is stamped in the lower wall 72 of the of the secondary igniter cup 70. The secondary mounting portion 75 has a recessed and generally cup-shaped configuration with an axially extending side wall 82, an end wall 83, and an opening 84 that extends through the end wall. The secondary igniter assembly 200 is press fit into the opening 84 of the secondary mounting portion 75 to secure the secondary igniter assembly in position in a secondary combustion chamber 79. The secondary igniter assembly 200 is thus supported in the inflator 10 at a position centered on the second axis 52 and offset from the first axis 51 and the third axis 53.

A secondary cap 77 is secured to the upper open end of the side wall 74 to define the secondary combustion chamber 79. The secondary cap 77 is secured to the secondary igniter cup 70 by an interference fit. The secondary cap 77 has a domed configuration projecting away from the closure 40. The secondary end cap 77 could have an alternative configuration (not shown), such as a planar configuration. The secondary cap 77 has an inner surface 73 presented toward an inner surface 76 of the lower wall 72.

Prior to welding the diffuser 30 to the closure 40, the secondary igniter assembly 200, secondary cup 70, and secondary cap 77 are assembled and placed within the primary combustion chamber 99 of the diffuser 30 such that the secondary cap 77 abuts the inner surface 46 of the diffuser. The closure 40 is then positioned so that the circular opening 68 is aligned with the lower end of the secondary igniter assembly 200 (FIG. 2). An annular elastomeric seal 81 may be disposed between the lower wall 72 of the secondary igniter cup 70 and the inner surface 66 of the closure 40.

The inflator 10 further includes a first actuatable inflation fluid source 110 in the form of a primary solid propellant. The primary propellant 110 is disposed in the primary combustion chamber 99, at least partially encircling or surrounding the side wall 74 of the secondary igniter cup 70. The primary propellant 110 is a known material that is ignitable via actuation of the primary igniter assembly 100. The primary propellant 110, when ignited, produces inflation fluid in the form of gas under pressure for inflating the air bag 14. The primary propellant 110 is illustrated as being provided in the form of generally cylindrical pellets filling or substantially filling the primary propellant chamber 99. Alternatively, the primary propellant 110 could be provided in the form of small discs or tablets.

The inflator 10 includes a second actuatable inflation fluid source 210 in the form of a secondary solid propellant disposed in the secondary combustion chamber 79. The secondary propellant 210 is a known material that is ignitable via actuation of the secondary igniter assembly 200. The secondary propellant 210, when ignited, produces inflation fluid in the form of gas under pressure for inflating the air bag 14. The secondary propellant 210 may be made from the same material as the primary propellant 110. The secondary propellant 210 is illustrated as being provided in the form of a plurality of small generally cylindrical pellets filling or substantially filling the secondary propellant chamber 79. Alternatively, the secondary propellant 210 could be provided in the form of discs or tablets.

Upon sensing the occurrence of an event for which inflation of the air bag 14 is desired, the sensor 16 provides a signal to the controller 18. The controller 18 is operative to actuate selectively either the primary igniter assembly 100 alone or both the primary igniter assembly and the secondary igniter assembly 200 in response to the signal from the sensor. If the signal is above a first predetermined threshold level, but below a second predetermined threshold level, the controller 18 actuates only the primary igniter assembly 100. The primary igniter assembly 100, when actuated, ignites the primary propellant 110 in the primary combustion chamber 99. The primary propellant 110 combusts and produces inflation fluid under pressure in the primary propellant chamber 99. The pressure in the primary propellant chamber 99 rises rapidly.

Figure 3:
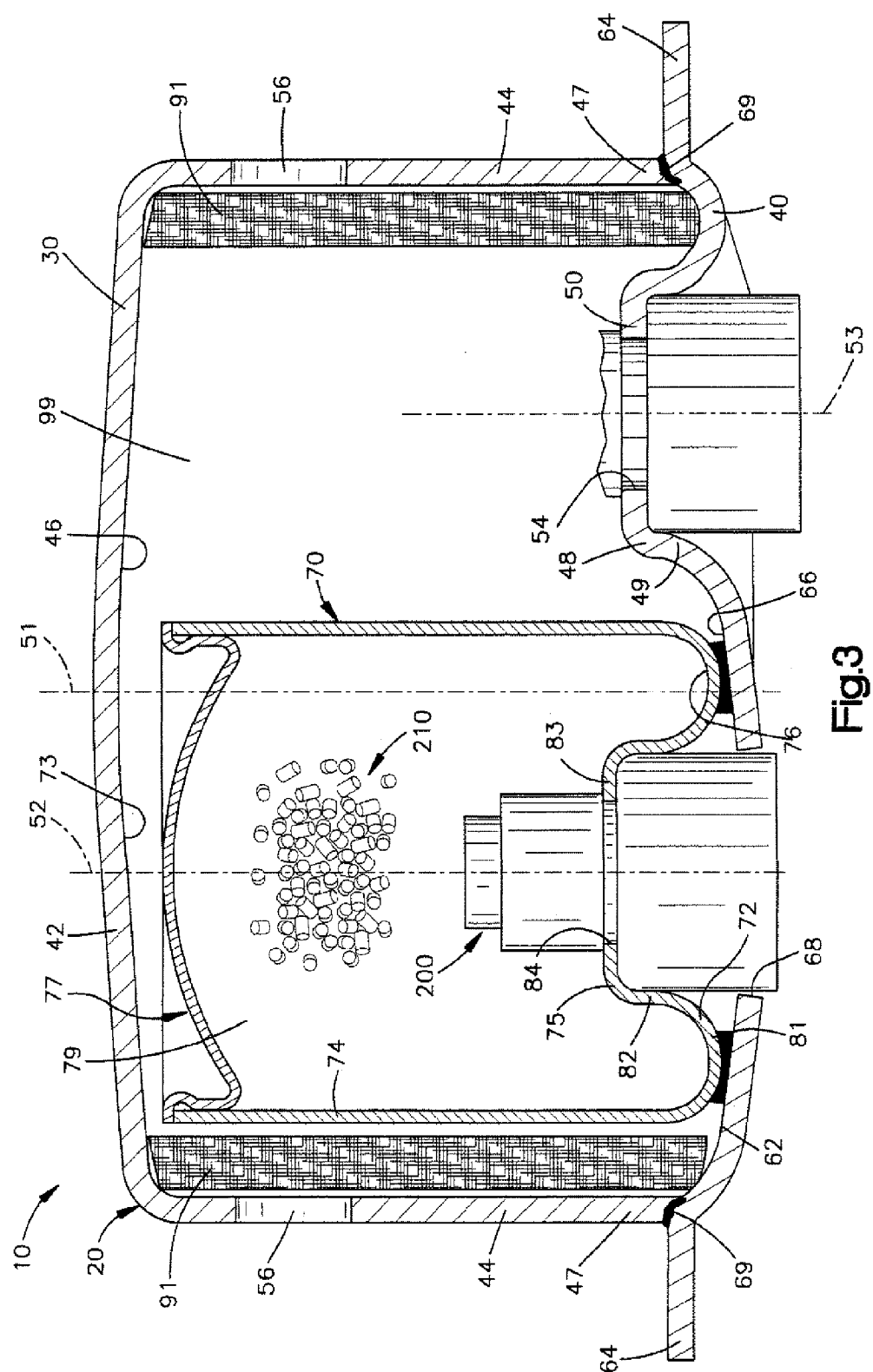
FIG. 3 is a schematic view of the inflator of FIG. 2 in an actuated condition.

The assembled secondary igniter cup 70 and secondary cap 77 during this time block flow of combustion products from the primary propellant chamber 99 into the secondary propellant chamber 79 (FIG. 3). This prevents ignition of the secondary propellant 210 when the controller 18 actuates only the primary igniter assembly 100.

The material thickness of the diffuser 30 and closure 40 is selected so that the upper and lower walls 42 and 62 deform in response to inflation fluid pressure in the primary combustion chamber 99. Specifically, the upper wall 42 of the diffuser 30 deforms axially outward (in an upward direction as viewed in FIG. 3). Simultaneously, the lower wall 62 of the closure 40 deforms axially outward in an opposite downward direction as viewed in FIG. 3. The degree to which the walls 42 and 62 deform or deflect is dependent upon the pressure in the primary combustion chamber 99. As the fluid pressure in the primary combustion chamber 99 increases, the degree to which the walls 42 and 62 deflect also increases.

As the walls 42 and 62 of the diffuser 30 and closure 40, respectively, move away from each other, the pressure of the inflation fluid in the primary propellant chamber 99 forces the primary igniter assembly 100 against the primary mounting portion 48 of the closure 40. The force exerted by the inflation fluid on the primary igniter assembly 100 affects a fluid-tight seal between the primary igniter assembly 100 and the closure 40.

As a result of the deformation of the walls 42 and 62 of the diffuser 30 and closure 40, the distance between the upper wall 42 of the diffuser and the lower wall 62 of the closure increases. Therefore, the secondary igniter cup 70 is no longer trapped axially between the diffuser 30 and the closure 40. The pressure of the inflation fluid in the primary propellant chamber 99, acting in a downward direction (as viewed in FIG. 3) on the secondary cap 77 holds the secondary cap in engagement with the side wall 74 of the secondary igniter cup 70.

The inflation fluid flows out of the primary propellant chamber 99, through an annular filter 91, and toward the inflation fluid outlets 56. The fluid outlets 56 direct the inflation fluid to flow out of the diffuser 30 to the air bag 14.

If the signal provided by the sensor 16 is above a second predetermined threshold level, greater than the first threshold level, the controller 18 actuates both the primary igniter assembly 100 and the secondary igniter assembly 200. The actuation of the primary igniter assembly 100 results in ignition of the primary propellant 110, as described above. Inflation fluid produced by the primary propellant 110 deforms the diffuser 30 and closure 40, and flows out of the inflator 10, as described above.

Figure 4:
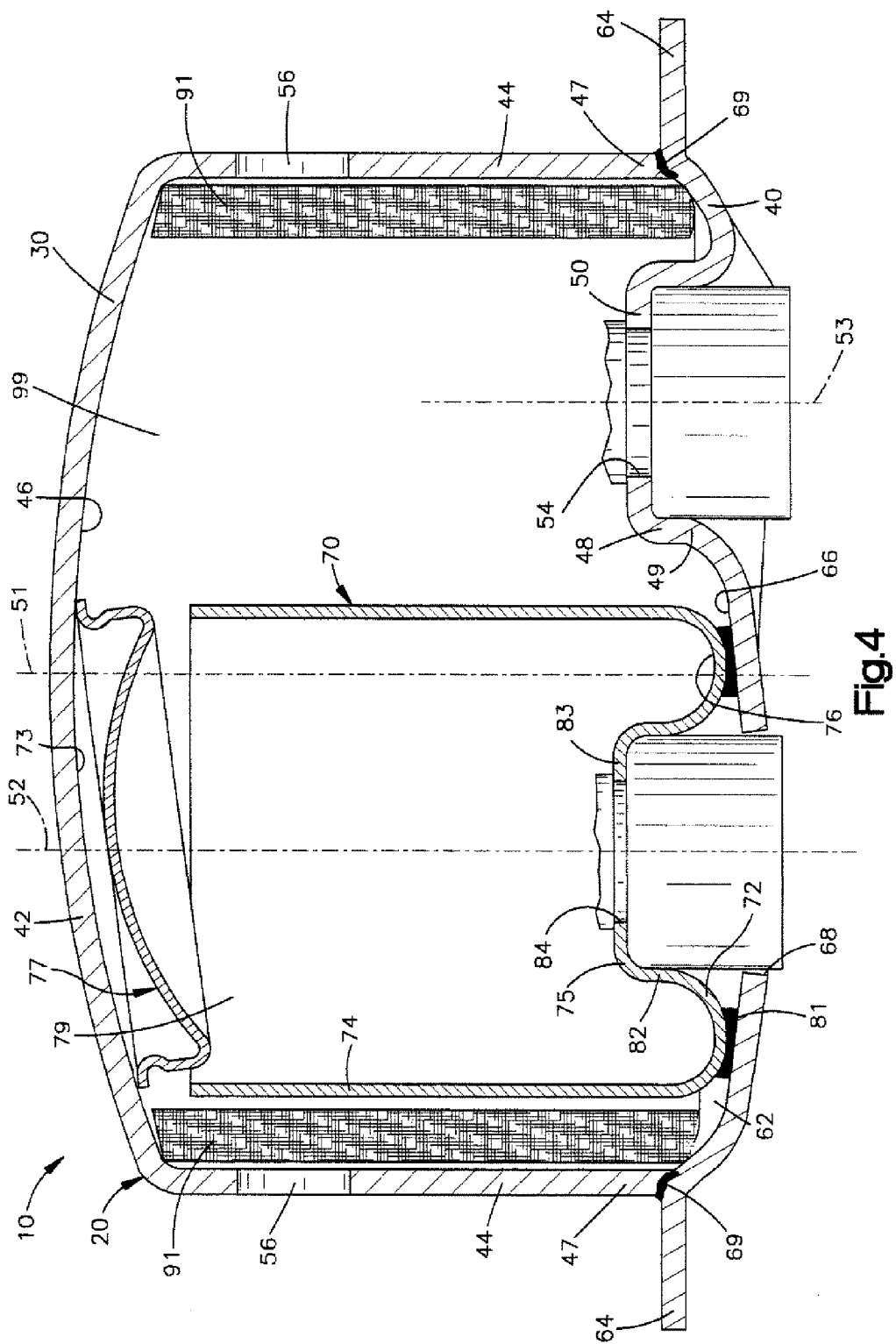
FIG. 4 is a schematic view of the inflator of FIG. 2 in another actuated condition.

The secondary igniter assembly 200, when actuated, ignites the secondary propellant 210. The secondary propellant 210 produces combustion products that increase the pressure in the secondary combustion chamber 79. This increased pressure acts on the secondary cap 77 and causes the secondary cap to move out of engagement with the side wall 74 of the secondary igniter cup 70 (FIG. 4). This movement of the secondary cap 77 is allowed due to the clearance created by the deformation of the diffuser 30 and the closure 40.

The combustion products of the secondary propellant 210 are thereby combined with the combustion products of the primary propellant 110 in the primary combustion chamber 99. The resulting increase of pressure in the primary combustion chamber 99 causes the diffuser 30 and closure 40 to deform more than when only the primary propellant 110 is ignited (FIG. 4). The combined combustion products of the secondary propellant 210 and the primary propellant 110 flow through the filter 91 and out of the inflator 10 in the manner described above.

The diffuser 30, the closure 40, the secondary igniter cup 70, and the secondary cap 77 are fabricated from sheet metal by a stamping process. The relative absence of machined or other precise tolerance features within the inflator 10 reduces production and assembly costs while still maintaining the functional relationships between the internal parts of the inflator 10.

Figure 5:
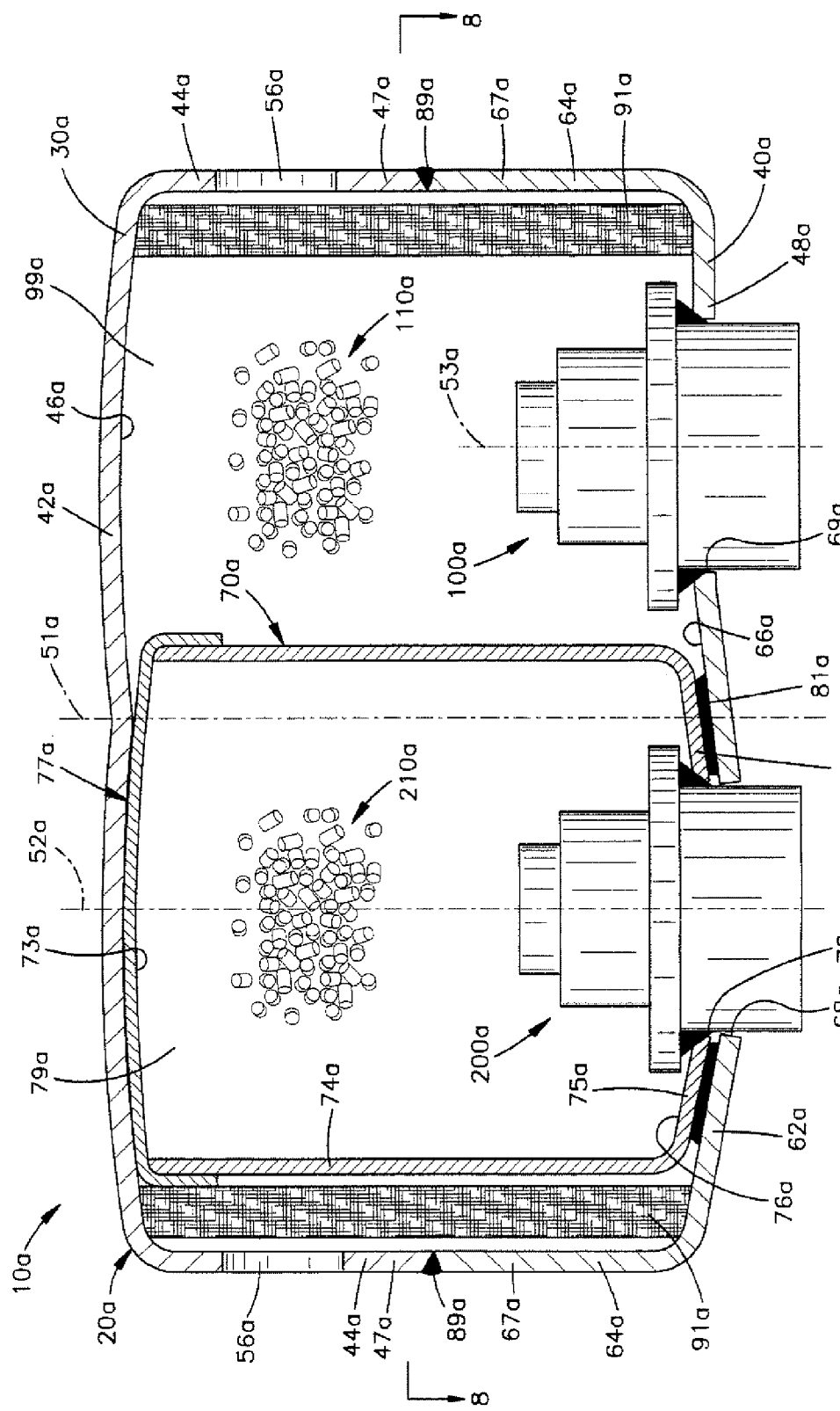
FIG. 5 is a sectional view of an inflator in an unactuated condition in accordance with a second embodiment of the present invention.

As shown in FIG. 5, a second embodiment of the inflator 10a includes a generally cylindrical housing 20a. Referring to FIGS. 5 and 8, the inflator 10a has a generally cylindrical configuration. The housing 20a (FIG. 5) includes a first or upper housing part 30a, referred to herein as a diffuser, and a second or lower housing part 40a, referred to herein as a closure.

The diffuser 30a has a downwardly open, cup-shaped configuration centered on a first primary axis 51a of the inflator 10a. The diffuser 30a includes a radially extending upper wall 42a and an axially extending side wall 44a. As shown in FIG. 5, the upper wall 42a of the diffuser 30a may have a generally domed or concave configuration projecting generally away from the closure 40. The upper wall 42a could alternatively have a generally planar configuration (not shown).

The side wall 44a of the diffuser 30a has a cylindrical configuration centered on the first axis 51a. A plurality of inflation fluid outlets, or exhaust ports, 56a are disposed in a circular array about the cylindrical side wall 44a. Each one of the inflation fluid outlets 56a extends radially through the side wall 44a. The outlets 56a enable flow of inflation fluid out of the inflator 10a to inflate the air bag 14. The outlets 56a, as a group, have a fixed, predetermined flow area.

The closure 40a has a cup-shaped configuration including a radially extending lower wall 62a. The lower wall 62a of the closure 40a has a generally domed configuration and projects away from the diffuser 30a. The lower wall 62a has an inner surface 66a presented toward an inner surface 46a of the upper wall 42a of the diffuser 30a. A first circular opening 68a in the lower wall 62a is centered on a second axis 52a that is parallel to and radially offset from the first axis 51a. A second circular opening 69a in the lower wall 62a is centered on a third axis 53a that is parallel to and radially offset from the first axis 51a and the second axis 52a.

The closure 40a is centered on the first axis 51a. The closure 40a is welded to a lower terminal end 47a of the diffuser 30a with a single, continuous circular weld 89a. The diffuser 30a and closure 40a together define a primary combustion chamber 99a.

The inflator 10a further includes a primary igniter assembly 100a and a secondary igniter assembly 200a. The primary igniter assembly 100a is mounted to a primary mounting portion 48a of the closure 40a. The primary mounting portion 48a is centered on the third axis 53a. The primary mounting portion 48a extends axially toward the upper wall 42a of the diffuser 30a. The primary mounting portion 48a has a generally planar configuration and includes the second circular opening 69a that extends through the primary mounting portion.

The primary igniter assembly 100a may be a known device that is electrically actuatable to generate combustion products. The primary mounting portion 48a helps position the primary igniter assembly 100a on the closure 40a. The primary igniter assembly 100a is disposed in the second circular opening 69a and welded to the primary mounting portion 48a to secure and position the primary igniter assembly in the primary combustion chamber 99a. The primary igniter assembly 100a is thus disposed at a location in the inflator 10a centered on the third axis 53a.

The inflator 10a further includes a secondary igniter cup 70a for helping to secure the secondary igniter assembly 200a in the inflator. The secondary igniter cup 70a is centered on the second axis 52a. The secondary igniter cup 70a includes a radially extending lower wall 72a and an axially extending cylindrical side wall 74a. The lower wall 72a of the secondary igniter cup 70a has a generally dome-shaped configuration with a central mounting portion 75a centered on the second axis 52a and projecting toward the closure 40a. The lower wall 72a could have an alternative configuration (not shown), such as a planar configuration.

The central mounting portion 75a has an opening 78a that extends through the central mounting portion. The secondary igniter assembly 200a is disposed in the opening 78a of the central mounting portion 75a and welded to the central mounting portion for positioning the secondary igniter assembly in a secondary combustion chamber 79a. The secondary igniter assembly 200a is thus supported in the inflator 10a at a position centered on the second axis 52a and offset from the first axis 51a and the third axis 53a.

A secondary cap 77a is secured to the upper open end of the side wall 74a to define the secondary combustion chamber 79a. The secondary cap 77a is secured to the secondary igniter cup 70a by an interference fit. The secondary cap 77a has a domed configuration projecting away from the closure 40a. The secondary cap 77a could have an alternative configuration (not shown), such as a planar configuration. The secondary cap 77a has an inner surface 73a presented toward an inner surface 76a of the lower wall 72.

Prior to welding the diffuser 30a to the closure 40a, the secondary igniter assembly 200a, secondary igniter cup 70a, and secondary cap 77a are assembled and placed within the primary combustion chamber 99a of the diffuser 30a such that the secondary cap 77a abuts the inner surface 46a of the diffuser. The closure 40a is then positioned so that the circular opening 68a is aligned with the lower end of the secondary igniter assembly 200a (FIG. 5). An annular elastomeric seal 81a may be disposed between the lower wall 72a of the secondary igniter cup 70a and the inner surface 66a of the closure 40a.

The inflator 10a further includes a first actuatable inflation fluid source 110a in the form of a primary solid propellant. The primary propellant 110a is disposed in the primary combustion chamber 99a, at least partially encircling or surrounding the side wall 74a of the secondary igniter cup 70a. The primary propellant 110a is a known material that is ignitable via actuation of the primary igniter assembly 100a. The primary propellant 110a, when ignited, produces inflation fluid in the form of gas under pressure for inflating the air bag 14. The primary propellant 110a is illustrated as being provided in the form of generally cylindrical pellets filling or substantially filling the primary propellant chamber 99a. Alternatively, the primary propellant 110a could be provided in the form of small discs or tablets.

The inflator 10a includes a second actuatable inflation fluid source 210a in the form of a secondary solid propellant disposed in the secondary combustion chamber 79a. The secondary propellant 210a is a known material that is ignitable via actuation of the secondary igniter assembly 200a. The secondary propellant 210a, when ignited, produces inflation fluid in the form of gas under pressure for inflating the air bag 14. The secondary propellant 210a may be made from the same material as the primary propellant 110a. The secondary propellant 210a is illustrated as being provided in the form of a plurality of small generally cylindrical pellets filling or substantially filling the secondary propellant chamber 79a. Alternatively, the secondary propellant 210a could be provided in the form of discs or tablets.

Figure 6:
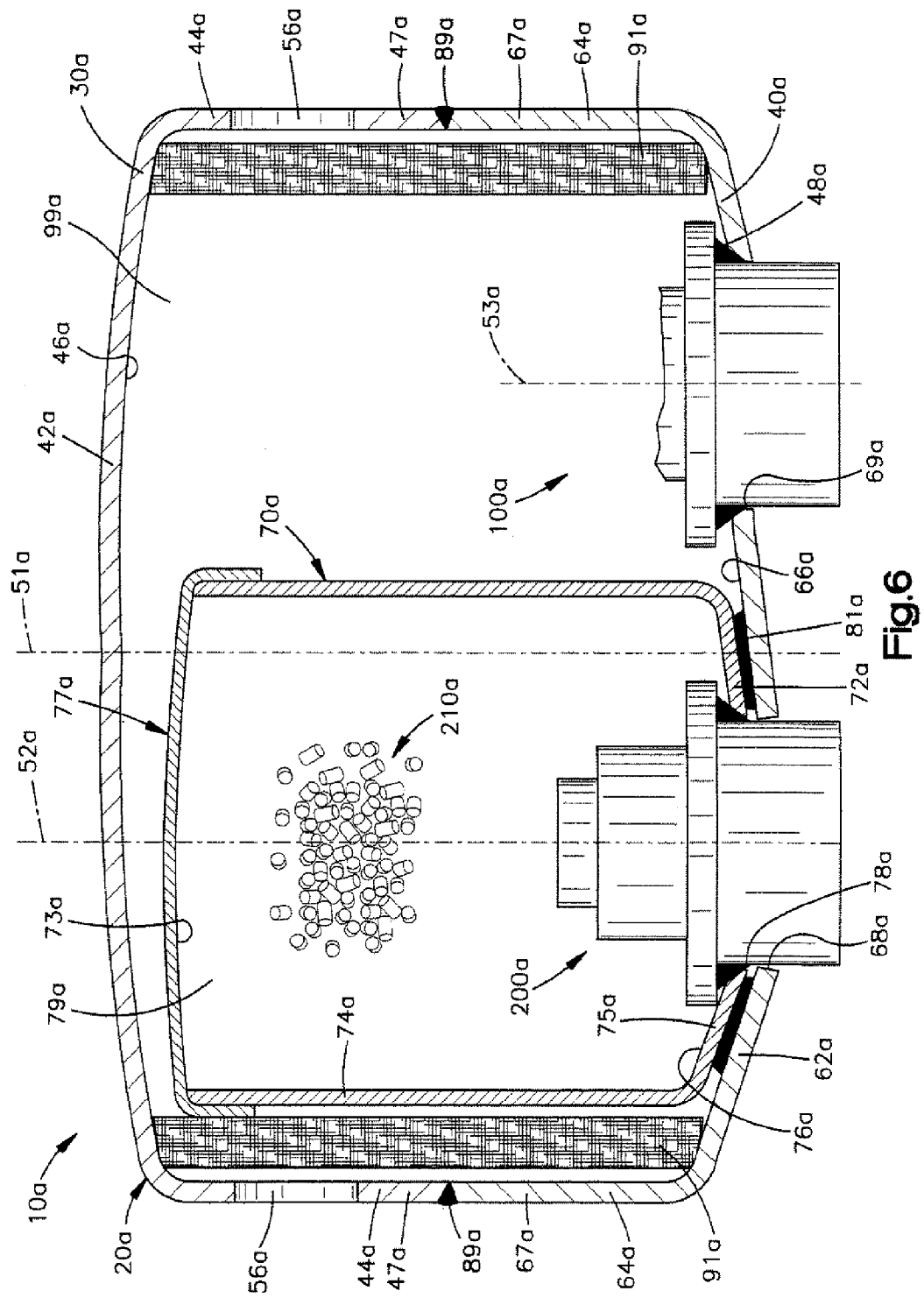
FIG. 6 is a schematic view of the inflator of FIG. 5 in an actuated condition.

Upon sensing the occurrence of an event for which inflation of the air bag 14 is desired, the sensor 16 provides a signal to the controller 18. The controller 18 is operative to actuate selectively either the primary igniter assembly 100a alone or both the primary igniter assembly and the secondary igniter assembly 200a in response to the signal from the sensor. If the signal is above a first predetermined threshold level, but below a second predetermined threshold level, the controller 18 actuates only the primary igniter assembly 100a. The primary igniter assembly 100a, when actuated, ignites the primary propellant 110a in the primary combustion chamber 99a. The primary propellant 110a combusts and produces inflation fluid under pressure in the primary propellant chamber 99a (FIG. 6). The pressure in the primary propellant chamber 99a rises rapidly.

The assembled secondary igniter cup 70a and secondary cap 77a during this time block flow of combustion products from the primary propellant chamber 99a into the secondary propellant chamber 79a. This prevents ignition of the secondary propellant 210a when the controller 18 actuates only the primary igniter assembly 100a.

The material thickness of the diffuser 30a and closure 40a is selected so that the upper and lower walls 42a and 62a deform in response to inflation fluid pressure in the primary combustion chamber 99a. Specifically, the upper wall 42a of the diffuser 30a deforms axially outward (in an upward direction as viewed in FIG. 6). Simultaneously, the lower wall 62a of the closure 40a deforms axially outward in an opposite downward direction as viewed in FIG. 6. The degree to which the walls 42a and 62a deform or deflect is dependent upon the pressure in the primary combustion chamber 99a. As the fluid pressure in the primary combustion chamber 99a increases, the degree to which the walls 42a and 62a deflect also increases.

As the walls 42a and 62a of the diffuser 30a and closure 40a, respectively, move away from each other, the pressure of the inflation fluid in the primary propellant chamber 99a forces the primary igniter assembly 100a against the primary mounting portion 48a of the closure 40a. The force exerted by the inflation fluid on the primary igniter assembly 100a augments the weld connection and affects a fluid-tight seal between the primary igniter assembly 100a and the closure 40a.

As a result of the deformation of the walls 42a and 62a of the diffuser 30a and closure 40a, the distance between the upper wall 42a of the diffuser and the lower wall 62a of the closure increases. Therefore, the secondary igniter cup 70a is no longer trapped axially between the diffuser 30a and the closure 40a. The pressure of the inflation fluid in the primary propellant chamber 99a, acting in a downward direction (as viewed in FIG. 6) on the secondary cap 77a holds the secondary cap in engagement with the side wall 74a of the secondary igniter cup 70a.

The inflation fluid flows out of the primary propellant chamber 99a, through an annular filter 91a, and toward the inflation fluid outlets 56a. The fluid outlets 56a direct the inflation fluid to flow out of the diffuser 30a to the air bag 14.

If the signal provided by the sensor 16 is above a second predetermined threshold level, greater than the first threshold level, the controller 18 actuates both the primary igniter assembly 100a and the secondary igniter assembly 200a. The actuation of the primary igniter assembly 100a results in ignition of the primary propellant 110a, as described above. Inflation fluid produced by the primary propellant 110a deforms the diffuser 30a and closure 40a, and flows out of the inflator 10a, as described above.

Figure 7:
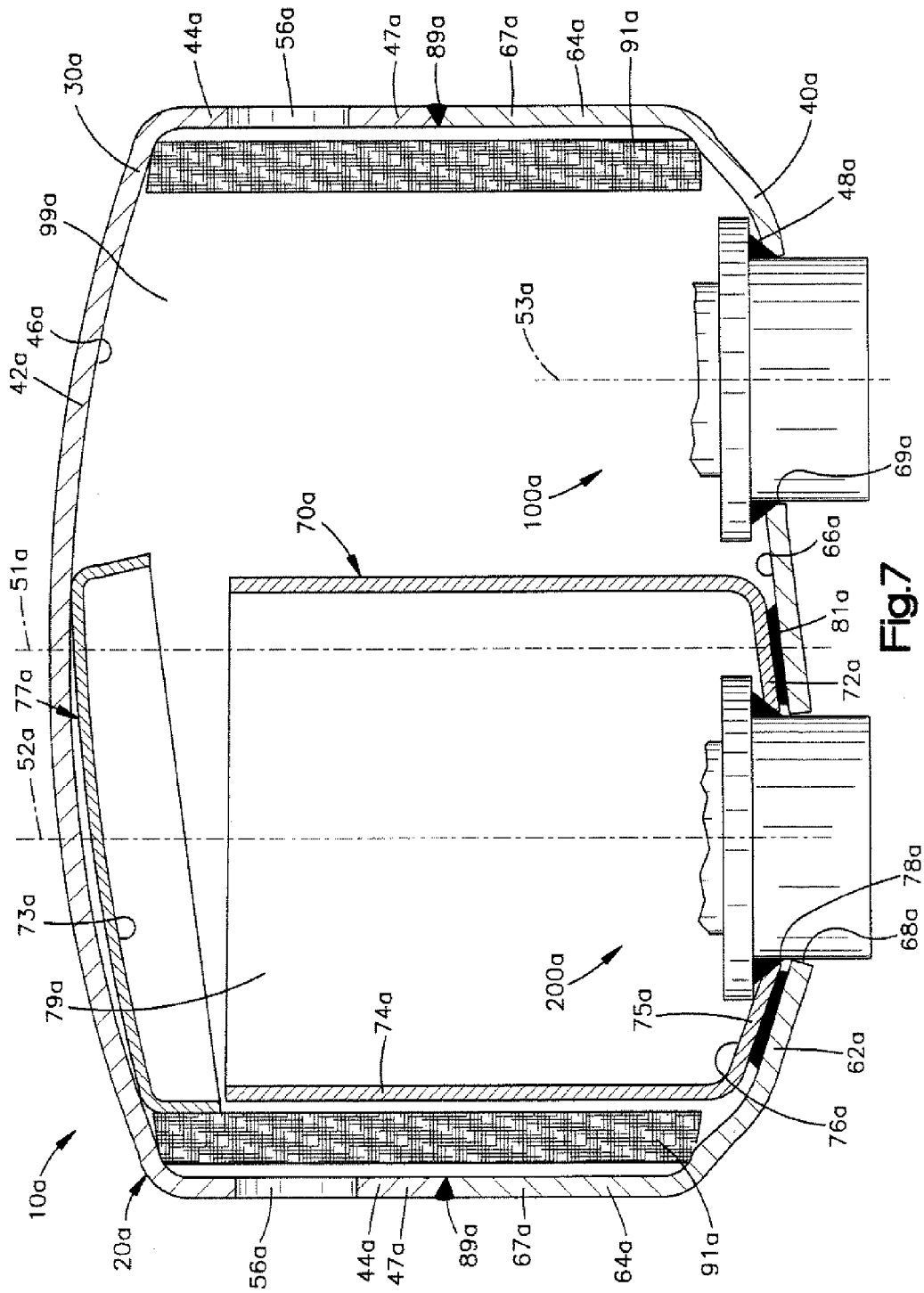
FIG. 7 is a schematic view of the inflator of FIG. 5 in another actuated condition.

The secondary igniter assembly 200a, when actuated, ignites the secondary propellant 210a. The secondary propellant 210a produces combustion products that increase the pressure in the secondary combustion chamber 79a. This increased pressure acts on the secondary cap 77a and causes the secondary cap to move out of engagement with the side wall 74a of the secondary igniter cup 70a (FIG. 7). This movement of the secondary cap 77a is allowed due to the clearance created by the deformation of the diffuser 30a and the closure 40a.

The combustion products of the secondary propellant 210a are thereby combined with the combustion products of the primary propellant 110a in the primary combustion chamber 99a. The resulting increase of pressure in the primary combustion chamber 99a causes the diffuser 30a and closure 40a to deform more than when only the primary propellant 110a is ignited (FIG. 7). The combined combustion products of the secondary propellant 210a and the primary propellant 110a flow through the filter 91a and out of the inflator 10a in the manner described above.

The diffuser 30a, the closure 40a, the secondary igniter cup 70a, and the secondary cap 77a are fabricated from sheet metal by a stamping process. The relative absence of machined or other precise tolerance features within the inflator 10a reduces production and assembly costs while still maintaining the functional relationships between the internal parts of the inflator 10a.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for providing inflation fluid for inflating an inflatable vehicle occupant protection device, the apparatus comprising:
    a primary housing constructed from sheet metal by stamping;
    a primary inflation fluid source in the primary housing actuatable to effect a primary flow of inflation fluid out of the primary housing to inflate the inflatable device;
    a secondary housing constructed from sheet metal by stamping, the secondary housing being disposed within the primary housing; and
    a secondary inflation fluid source in the secondary housing actuatable to effect a secondary flow of inflation fluid to supplement the primary flow of inflation fluid,
    the secondary housing having a first portion that moves at least partially out of engagement with a second portion of the secondary housing when the secondary inflation fluid source is actuated, wherein the primary housing is centered on a first axis and the secondary housing is centered on a second axis radially offset from and parallel to the first axis.

2. The apparatus as set forth in claim 1 wherein the first portion of the secondary housing comprises a dome shaped cap having an interference fit with the secondary housing.

3. The apparatus as set forth in claim 1 wherein the primary inflation fluid source comprises a primary igniter assembly and a primary propellant.

4. The apparatus as set forth in claim 3 wherein the secondary inflation fluid source comprises a secondary igniter assembly and a secondary propellant.

5. The apparatus as set forth in claim 1 wherein the primary housing comprises a cup-shaped diffuser and a closure secured to the diffuser, the diffuser and the closure defining a primary combustion chamber for the primary inflation fluid source.

6. The apparatus as set forth in claim 5 wherein the first portion of the secondary housing comprises a cup member and the second portion of the secondary housing comprises a cap member secured to the cup member, the cup member and the cap member defining a secondary combustion chamber.

7. The apparatus as set forth in claim 1 further comprising a primary igniter assembly for igniting the primary inflation fluid source, the primary igniter assembly being centered on a third axis radially offset from and parallel to the first axis and radially offset from and parallel to the second axis.

8. The apparatus as set forth in claim 1 wherein the first portion of the secondary housing comprises an upper end portion and the second portion of the secondary housing comprises an opposite lower end portion, the upper end portion comprising a cap secured to the lower end portion and abutting an inner surface of the primary housing.

9. The apparatus as set forth in claim 1 further comprising an elastomeric seal for sealing the secondary housing to an inner surface of the primary housing.

10. An inflator for providing inflation fluid for inflating an inflatable vehicle occupant protection device, the inflator comprising:
    a primary housing having an upper wall and a lower wall opposite the upper wall, the primary housing being constructed from sheet metal by stamping;
    a primary inflation fluid source disposed within the primary housing actuatable to deform the primary housing to move the upper wall and the lower wall away from each other;
    a secondary housing constructed from sheet metal by stamping and including an upper portion and a lower portion, the secondary housing being disposed within the primary housing; and
    a secondary inflation fluid source disposed within the secondary housing actuatable to move the upper portion of the secondary housing relative to the lower portion of the secondary housing to release inflation fluid from the secondary housing, wherein the upper portion of the secondary housing abuts the upper wall of the primary housing and the lower portion of the secondary housing abuts the lower wall of the primary housing prior to actuation of the primary inflation fluid source.

11. The inflator as set forth in claim 10 wherein the upper portion of the secondary housing comprises a cap having an interference fit with the lower portion of the secondary housing.

12. The inflator as set forth in claim 10 wherein the primary housing has a primary circular opening for securing a primary igniter to the primary housing.

13. The inflator as set forth in claim 12 wherein the primary housing has a secondary circular opening for securing a secondary igniter to the primary housing.

14. The inflator as set forth in claim 13 wherein the secondary housing has a circular opening concentric with the secondary circular opening of the primary housing.

15. The inflator as set forth in claim 10 wherein the primary housing has a curved inner surface for securing the secondary housing within the primary housing.

16. The inflator as set forth in claim 10 wherein the secondary housing is secured to the primary housing by an elastomeric seal.

17. The inflator as set forth in claim 10 wherein the primary housing comprises an upper portion and a lower portion welded to the upper portion.

18. The inflator as set forth in claim 10 wherein the primary housing includes a recessed mounting portion for securing a primary igniter to the primary housing.

19. The inflator as set forth in claim 18 wherein the secondary housing includes a recessed mounting portion for securing a secondary igniter to the secondary housing.

20. The inflator as set forth in claim 10 wherein the primary housing includes an annular mounting flange for securing the inflator to a vehicle.

* * * * *